UNITED STATES PATENT OFFICE.

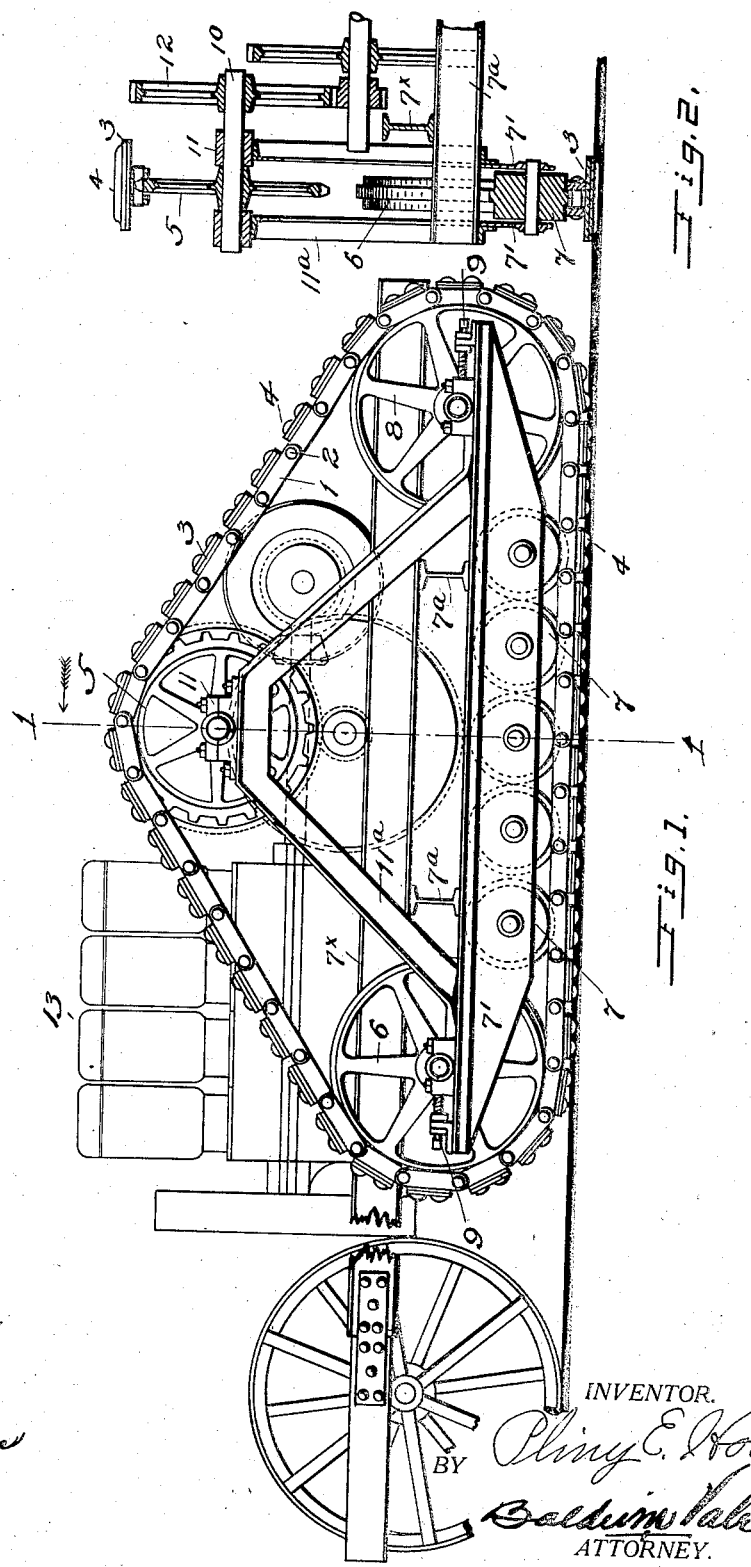

PLINY E. HOLT, OF STOCKTON, CALIFORNIA.

TRACTION-ENGINE.

994,317.    Specification of Letters Patent.    Patented June 6, 1911.

Application filed January 19, 1909. Serial No. 473,194.

*To all whom it may concern:*

Be it known that I, PLINY E. HOLT, a citizen of the United States, and residing at Stockton, county of San Joaquin, and State of California, have invented certain new and useful Improvements in Traction-Engines; and I do hereby declare the following to be a full, clear, and exact description of the said invention, such as will enable others skilled in the art to which it most nearly appertains to make, use, and practice the same.

This invention relates to improvements in traction engines, and more particularly to the traction mechanisms thereof, and consists in the novel construction and arrangement of the parts as hereinafter described.

The objects sought to be accomplished are to obtain the maximum traction surface in contact with the ground; to place the driving mechanism so far as practicable from the ground to avoid dust and grit, and to equalize the strain on the traction belt by suspending it from the driving sprocket which is mounted above and independent of the tractor supporting rollers, whereby the belt is always pulled, and never pushed, irrespective of the direction of progress of the tractor. In this class of tractors it has been the practice heretofore to drive the traction belt from a point at or near the ground. In some instances the belt has been drawn under a series of supporting rollers by the rear sprocket. This method is particularly objectionable when the direction of progress is reversed, as there is then a tendency to buckle and cramp the traction belt under the rollers, resulting in undue strain and wear. In traveling over sandy wastes or through mud, or under other bad conditions where the traction belt is working under the greatest possible disadvantage, this buckling up of the belt is very serious. By placing the driving sprocket above the tractor frame this buckling of the belt is obviated, and the gears actuating the driving sprocket are removed to a greater distance from the dust and grit of the roadway than is the case where the driving sprocket is placed at the rear and below the tractor frame.

Broadly, the invention consists of a tractor frame; an endless link belt provided with transverse traction sections of suitable width, the slack of the belt being suspended from the driving sprocket, whereby that portion under traction is maintained taut during progress in either direction; a truck having a series of rollers journaled therein and adapted to travel within and on the traction belt, and supporting the tractor; end rollers of sufficient diameter around which the traction belt is adapted to travel, and adjustably mounted in the ends of the supporting truck; and a suitable motive mechanism.

In the drawings; Figure 1 is a side elevation of a traction mechanism drawn to illustrate this invention. Fig. 2 is a vertical cross section on the line I—I of Fig. 1, of the traction belt and its driving and supporting mechanisms.

In the following description the term "tractor" will be understood to define a complete locomotive machine; the term "traction mechanism" will define that portion of the tractor intimately associated with the traction belt; the term "motive mechanism" will define the motive unit and the intermediate driving mechanisms. The traction mechanism comprises the traction belt, the driving sprocket and the supporting roller truck with its superstructure, and is a complete device, adapted, with a few minor changes, to be substituted for the high concentric traction wheels in use on some types of tractors.

In detail the construction consists of the traction belt comprising the links #1, joined by the pins #2, and surmounted by the transverse traction sections #3, preferably composed of a plate of sheet steel having the grousers #4 struck up from the body thereof. This endless belt is driven from the sprocket #5, and passes around and beneath the idler #6, and under the rollers #7, and beneath and around the idler #8, and back to the driving sprocket. The rollers #7 are mounted between the side bars 7' of a traction frame which side bars are in turn suitably secured to beams $7^a$ of the main frame $7^x$. Said rollers are also provided with flanges to prevent lateral displacement of the traction belt. The travel of the traction belt describes substantially a triangle, the base being the traction portion, the side lines converging to the apex at the driving sprocket located above and functionally independent of the tractor supporting mechanisms.

To permit adjustment of the traction belt the idlers #6 and #8 are provided with slidable boxes and take-up bolts #9. The driving sprocket #5 is fixed upon the driving shaft #10, mounted in bearings 11 supported at the apexes of triangular bars 11ª of a super frame secured to the side bars 7', and is driven by the spur gear #12 actuated through suitable reducing gear by the motor #13.

For the sake of lucidity, only the barest essential elements of the invention have been incorporated in this application, and all details relating to the application of the invention to special purposes, the details of motive power and of power transmission, control of the machine, fuel storage, lubrication, et cetera, have been purposely omitted. It is obvious that the traction mechanism may be located upon both sides of the tractor; or that it may be upon one side only, in which case the ordinary concentric traction-wheel can be used on the other side; or that the traction mechanism may be located in the center of the tractor; or that various minor changes may be made without departing materially from the spirit of the invention, for which this application for patent is drawn particularly with reference to the construction and arrangement of the traction mechanisms.

Having thus described this invention what is claimed and desired to secure by Letters Patent is:

1. A traction mechanism comprising a main frame, a traction truck secured thereto and having side bars, idlers mounted in opposite ends of said truck, an endless traction belt passed around said idlers, a series of rollers carried by said side bars and located between said idlers, said rollers engaging the lower stretch of the belt to hold the latter in contact with the ground, a super frame secured to said side bars at a point between said idlers and above the plane of the latter, and a driving sprocket mounted in said super frame, the upper stretch of said belt being suspended from said sprocket whereby said belt is always taut irrespective of the direction of rotation of said driving sprocket.

2. A traction mechanism comprising a main frame, a traction truck secured thereto and having side bars, idlers mounted in opposite ends of said truck, an endless traction belt passed around said idlers, a series of rollers carried by said side bars and located between said idlers, said rollers engaging the lower stretch of the belt to hold the latter in contact with the ground, said rollers being provided with means for preventing lateral displacement of said belt, a super frame secured to said side bars at a point between said idlers and extending above the plane of the latter, and a driving sprocket mounted in said superframe, the upper stretch of said belt being suspended from said sprocket whereby said belt is always taut irrespective of the direction of rotation of said driving sprocket.

3. A traction mechanism comprising a main frame, a traction truck secured thereto and having side bars, idlers mounted in opposite ends of said truck, an endless traction belt passed around said idlers, a series of rollers carried by said side bars and located between said idlers, said rollers engaging the lower stretch of the belt to hold the latter in contact with the ground, triangular bars secured to said side bars at a point between the idlers, the apexes of said triangular bars extending above the plane of said idlers, a driving sprocket supported by the apexes of said triangular bars, the upper stretch of said belt being suspended from said sprocket whereby said belt is always taut irrespective of the direction of rotation of said driving sprocket.

In testimony whereof, I have hereunto set my hand this 23rd. day of December 1908.

PLINY E. HOLT.

Witnesses:
BALDWIN VALE,
ELLA CHISHOLM.